(12) United States Patent
Cote et al.

(10) Patent No.: US 7,315,811 B2
(45) Date of Patent: Jan. 1, 2008

(54) SYSTEM AND METHOD FOR ACCENTED MODIFICATION OF A LANGUAGE MODEL

(75) Inventors: William F. Cote, Carlisle, MA (US); Amy J. Uhrbach, Needham, MA (US); Jill Carrier, Dorchester, MA (US); Wensheng (Vincent) Han, Arlington, MA (US)

(73) Assignee: Dictaphone Corporation, Stratford, CT (US)

( * ) Notice: Subject to any disclaimer, the term of this patent is extended or adjusted under 35 U.S.C. 154(b) by 284 days.

(21) Appl. No.: 11/007,626

(22) Filed: Dec. 8, 2004

(65) Prior Publication Data

US 2005/0165602 A1 Jul. 28, 2005

Related U.S. Application Data

(60) Provisional application No. 60/533,217, filed on Dec. 31, 2003.

(51) Int. Cl.
*G06F 17/27* (2006.01)
*G06F 17/21* (2006.01)
*G10L 15/00* (2006.01)

(52) U.S. Cl. .............................. 704/9; 704/10; 704/231

(58) Field of Classification Search .................... 704/4, 704/9, 1, 270, 275, 256, 255, 251, 254, 243, 704/236
See application file for complete search history.

(56) References Cited

U.S. PATENT DOCUMENTS

| 4,477,698 A | 10/1984 | Szlam et al. | |
| 4,965,763 A | 10/1990 | Zamora | |
| 5,253,164 A | 10/1993 | Holloway et al. | |
| 5,325,293 A | 6/1994 | Dorne | |
| 5,327,341 A | 7/1994 | Whalen et al. | |
| 5,392,209 A | 2/1995 | Eason et al. | |
| 5,544,360 A | 8/1996 | Lewak et al. | 707/1 |
| 5,664,109 A | 9/1997 | Johnson et al. | 705/2 |
| 5,799,268 A | 8/1998 | Boguraev | 704/9 |
| 5,809,476 A | 9/1998 | Ryan | |
| 5,832,450 A | 11/1998 | Myers et al. | 705/3 |
| 5,970,463 A | 10/1999 | Cave et al. | |
| 6,014,663 A | 1/2000 | Rivette et al. | 707/4 |
| 6,021,202 A | 2/2000 | Anderson et al. | |
| 6,052,693 A | 4/2000 | Smith et al. | 707/104.1 |
| 6,055,494 A | 4/2000 | Friedman | 704/9 |

(Continued)

OTHER PUBLICATIONS

F. Song et al., A Graphical Interface to a Semantic Medical Information System, *Journal of Foundations of Computing and Decision Sciences*, 22(2), 1997.

(Continued)

*Primary Examiner*—David Hudspeth
*Assistant Examiner*—Josiah Hernandez
(74) *Attorney, Agent, or Firm*—Kelley Drye & Warren LLP (57) ABSTRACT

A system and method for a speech recognition technology that allows language models for a particular language to be customized through the addition of alternate pronunciations that are specific to the accent of the dictator, for a subset of the words in the language model. The system includes the steps of identifying the pronunciation differences that are best handled by modifying the pronunciations of the language model, identifying target words in the language model for pronunciation modification, and creating a accented speech file used to modify the language model.

5 Claims, 2 Drawing Sheets

U.S. PATENT DOCUMENTS

| | | | |
|---|---|---|---|
| 6,088,437 A | 7/2000 | Amick | |
| 6,182,029 B1 | 1/2001 | Friedman | 704/9 |
| 6,192,112 B1 | 2/2001 | Rapaport et al. | |
| 6,216,102 B1* | 4/2001 | Martino et al. | 704/9 |
| 6,292,771 B1 | 9/2001 | Haug et al. | |
| 6,347,329 B1 | 2/2002 | Evans | |
| 6,366,882 B1* | 4/2002 | Bijl et al. | 704/235 |
| 6,405,165 B1 | 6/2002 | Blum et al. | |
| 6,434,547 B1 | 8/2002 | Mishelevich et al. | |
| 6,438,533 B1 | 8/2002 | Spackman et al. | |
| 6,553,385 B2 | 4/2003 | Johnson et al. | 707/104.1 |
| 6,778,252 B2* | 8/2004 | Moulton et al. | 352/12 |
| 6,915,254 B1 | 7/2005 | Heinze et al. | 704/9 |
| 6,947,936 B1 | 9/2005 | Suermondt et al. | 707/7 |
| 7,124,144 B2 | 10/2006 | Christianson et al. | 707/102 |
| 2002/0007285 A1 | 1/2002 | Rappaport | 705/2 |
| 2002/0095313 A1 | 7/2002 | Haq | 705/2 |
| 2002/0111805 A1* | 8/2002 | Goronzy et al. | 704/250 |
| 2002/0143824 A1 | 10/2002 | Lee et al. | 707/523 |
| 2002/0169764 A1 | 11/2002 | Kincaid et al. | 707/3 |
| 2003/0046264 A1 | 3/2003 | Kauffman | 707/1 |
| 2003/0061201 A1 | 3/2003 | Grefenstette et al. | 707/3 |
| 2003/0115080 A1 | 6/2003 | Kasravi et al. | 705/1 |
| 2003/0208382 A1 | 11/2003 | Westfall | 705/3 |
| 2003/0233345 A1 | 12/2003 | Perisic et al. | 707/3 |
| 2004/0073425 A1* | 4/2004 | Das et al. | 704/236 |
| 2004/0103075 A1 | 5/2004 | Kim et al. | 707/1 |
| 2004/0139400 A1 | 7/2004 | Allam et al. | 715/526 |
| 2004/0186746 A1 | 9/2004 | Angst et al. | 705/3 |
| 2004/0220895 A1 | 11/2004 | Carus et al. | |
| 2004/0223644 A1* | 11/2004 | Meurs | 382/185 |
| 2004/0243545 A1 | 12/2004 | Boone et al. | |
| 2004/0243551 A1 | 12/2004 | Boone et al. | |
| 2004/0243552 A1 | 12/2004 | Titemore et al. | |
| 2004/0243614 A1 | 12/2004 | Boone et al. | |
| 2005/0108010 A1 | 5/2005 | Frankel et al. | |
| 2005/0114122 A1 | 5/2005 | Uhrbach et al. | |
| 2005/0120020 A1 | 6/2005 | Carus et al. | |
| 2005/0120300 A1 | 6/2005 | Schwager et al. | |
| 2005/0143970 A1* | 6/2005 | Roth et al. | 704/4 |
| 2005/0144184 A1 | 6/2005 | Carus et al. | |
| 2006/0224586 A1* | 10/2006 | Pickover et al. | 707/6 |

OTHER PUBLICATIONS

F. Song et al., A Cognitive Model for the Implementation of Medical Problem Lists, *Proceedings of the First Congress on Computational Medicine, Public Health and Biotechnology*, Austin, Texas, 1994.

F. Song et al., A Graphical Interface to a Semantic Medical Information System, *Karp-95 Proceedings of the Second International Symposium on Knowledge Acquisition*, Representation and Processing, pp. 107-109, 1995.

*Epic Web Training Manual*, pp. 1-33, 2002.

B. Hieb, Research Note, NLP Basics for Healthcare, Aug. 16, 2002.

C. Shalizi et al., Pattern Discovery in Time Series, Part I: Theory, Algorithm, Analysis, and Convergence, *Journal of Machine Leaning Research* ? (2002) ?-? Submitted Oct. 28, 2002; Published ?/2002.

C. Nevill-Manning et al., The Development of Holte's 1R Classifier, Department of Computer Science.

D. Cutting et al., A Practical Part-of Speech Tagger, Xerox Palo Alto Research Center.

J. Zavrel et al., Recent Advances in Memory-Based Part-of-Speech Tagging, ILK/Computational Linguistics.

E. Brill, Some Advances in Transformation-Based Part of Speech Tagging, Spoken Language Systems Group.

J. Nivre, DAC723: Language Technology Finite State Morphology, Vaxjo University of Mathematics and Systems Engineering, p. 1/11.

M. Creutz, Morphology and Finite-State Transducers, Oct. 31, 2001, Chap 3, Jurafsky & Martin.

http://www.comp.lancs.ac.uk/computing/research/stemming/general/index.htm printed Jul. 19, 2004.

http://www.comp.lancs.ac.uk/computing/research/stemming/general/stemmingerrors.htm printed Jul. 19, 2004.

http://www.comp.lancs.ac.uk/computing/research/stemming/general/performance.htm printed Jul. 19, 2004.

M. Lee et al., Cleansing Data for Mining and Warehousing, Lecture Notes in Computer Science vol. 1677 archive, *Proceedings of the 10th International Conference on Database and Expert Systems Applications*, pp. 751-760, Springer-Verlag, London, 1999.

C. Van Rijsbergen, *Information Retrieval*, 2nd Ed., Ch. 5, Butterworths, London, 1979.

J. Day, Extracting Knowledge from Text Using Learning by Constraint Relaxation (LCR), CSI, www.csi-inc.com/CSI/pdf/jday_icim02.pdf.

W. Gale et al., Discrimination Decisions for 100,000-Dimensional Spaces, *Current Issues in Computational Linguistics*, pp. 429-450, Kluwer Academic Publishers, 1994.

W. Daelemans et al., TiMBL: Tilburg Memory Based Learner, version 5.0, Reference Guide, ILK *Research Group Technical Report Series No. 04-02* (ILK-0402), ILK Research Group, Tilburg University, Tilburg, Netherlands, 2004.

Case Study: Massachusetts Medical Society http://www.microsoft.com/resources/casestudies/CaseStudy.asp?CaseStudyID=14931 posted Jan. 13, 2004.

W. Braithwaite, Continuity of Care Record (CCR) http://www.h17.org/library/himss/2004Orlando/ContinuityofCareRecord.pdf.

C. Waegemann, EHR vs. CCR: What is the difference between the electronic health record and the continuity of care record?, Medical Records Institute, 2004.

Press Release: Kryptiq Announces Support of CCR Initiative and Introduces New Solutions that Enable Information Portability, Accessibility and Clinical System Interoperability, http://www.kryptiq.com/News/PressReleases/27.html posted Feb. 17, 2004.

Work Item Summary: WK4363 Standard Specification for the Continuity of Care Record (CCR), http://www.astm.org/cqi-bin/SoftCart.exe/DATABASE.CART/WORKITEMS/WK4363.htm?E+mystore Mar. 3, 2004.

Continuity of Care Record (CCR): The Concept Paper of the CCR. v. 2.1b, http://www.bhtinfo.com/CCR.Concept%20Paper.1.5.doc.

Continuity of Care Record, American Academy of Family Physicians, http://www.aafp.org/x24962.xml?printxml posted Nov. 12, 2003.

Continuity of Care Record (CCR), AAFP Center for Health Information Technology, http://www.centerforhit.org/x201.xml posted Aug. 20, 2004.

Core Measures web page, Joint Commission on Accreditation of Healthcare Organizations, http://www.jcaho.org/pms/core+measures/ printed Mar. 22, 2004.

*Specifications Manual for National Implementation of Hospital Core Measures*, v. 2.0, Joint Commission on Accreditation of Healthcare Organizations, http://www.jcaho.org/pms/core+measures/information+on+final+specifications.htm.

Code Information and Education web page, American Medical Association, http://www.ama-assn.org/ama/pub/category/3884.html printed Mar. 22, 2004.

Category III CPT Codes, American Medical Association, http://www.ama-assn.org/ama/pub/article/3885-4897.html printed Mar. 22, 2004.

ICD-9-CM Preface (FY04), http://ftp.cdc.gov/pub/Health_Statistics/NCHS/Publications/ICD9-CM/2004/Prefac05.RTF.

*ICD-9-CM Official Guidelines For Coding and Reporting*, effective Oct. 1, 2003.

Q. X. Yang et al., "Faster algorithm of string comparison," *Pattern Analysis and Applications*, vol. 6, No. 1, Apr. 2003: pp. 122-133.

"Hardware Reference Manual," Release 3 for DOS, revised Jan. 1994, PIKA Technologies, Inc., Ontario, Canada, available at http://www.pikatechnologies.com/downloads/legacy/AVA%20B-Series%20Hardware%20Manual.pdf (last accessed Jul. 25, 2005).

"Customizing D/41 Call Analysis," date unknown, Intel Corp., Santa Clara, California, available at http://resource.intel.com/telecom/support/appnotes/custd41d.htm (last accessed Jul. 25, 2005).

U.S. Appl. No. 11/068,493, Carus et al.

U.S. Appl. No. 10/953,471, Cote et al.

U.S. Appl. No. 11/069,203, Cote et al.

U.S. Appl. No. 10/840,428, Carus et al.

U.S. Appl. No. 10/951,281, Cote et al.

* cited by examiner

SYSTEM AND METHOD FOR ACCENTED MODIFICATION OF A LANGUAGE MODEL

CROSS-REFERENCE TO RELATED APPLICATIONS

This application claims the benefit of priority of U.S. Provisional Patent Application No. 60/533,217, entitled "A SYSTEM AND METHOD FOR ACCENTED MODIFICATION OF A LANGUAGE MODEL," filed Dec. 31, 2003, which is hereby incorporated by reference in its entirety.

This application relates to co-pending U.S. patent application Ser. No. 10/447,290, entitled "SYSTEM AND METHODS UTILIZING NATURAL LANGUAGE PATIENT RECORDS," filed on May 29, 2003; co-pending U.S. patent application Ser. No. 10/413,405, entitled "SYSTEMS AND METHODS FOR CODING INFORMATION," filed Apr. 15, 2003; co-pending U.S. patent application Ser. No. 11/068,493, entitled "A SYSTEM AND METHOD FOR NORMALIZATION OF A STRING OF WORDS," filed on Feb. 28, 2005; co-pending U.S. patent application Ser. No. 10/448,320, entitled "METHOD, SYSTEM, AND APPARATUS FOR DATA REUSE," filed on May 30, 2003; co-pending U.S. patent application Ser. No. 10/787,889, entitled "SYSTEM, METHOD AND APPARATUS FOR PREDICTION USING MINIMAL AFFIX PATTERNS," filed on Feb. 27, 2004; co-pending U.S. patent application Ser. No. 10/448,317, entitled "METHOD, SYSTEM, AND APPARATUS FOR VALIDATION," filed on May 30, 2003; co-pending U.S. patent application Ser. No. 10/448,325, entitled "METHOD, SYSTEM, AND APPARATUS FOR VIEWING DATA," filed on May 30, 2003; co-pending U.S. patent application Ser. No. 10/953,448, entitled "SYSTEM AND METHOD FOR DOCUMENT SECTION SEGMENTATIONS," filed on Sep. 30, 2004; co-pending U.S. patent application Ser. No. 10/953,471, entitled "SYSTEM AND METHOD FOR MODIIFYING A LANGUAGE MODEL AND POST-PROCESSOR INFORMATION," filed on Sep. 29, 2004; co-pending U.S. patent application Ser. No. 10/951,291, entitled "SYSTEM AND METHOD FOR CUSTOMIZING SPEECH RECOGNITION INPUT AND OUTPUT," filed on Sep. 27, 2004; co-pending U.S. patent application Ser. No. 10/953,474, entitled "SYSTEM AND METHOD FOR POST PROCESSING SPEECH RECOGNITION OUTPUT," filed on Sep. 29, 2004; co-pending U.S. patent application Ser. No. 10/951,281, entitled "METHOD, SYSTEM AND APPARATUS FOR REPAIRING AUDIO RECORDINGS," filed on Sep. 27, 2004; co-pending U.S. patent application Ser. No. 11/069,203, entitled "SYSTEM AND METHOD FOR GENERATING A PHASE PRONUNCIATION," filed on Feb. 28, 2005; co-pending U.S. patent application Ser. No. 10/948,625, entitled "METHOD, SYSTEM, AND APPARATUS FOR ASSEMBLY; TRANSPORT AND DISPLAY OF CLINICAL DATA," filed on Sep. 23, 2004; and co-pending U.S. patent application Ser. No. 10/840,428, entitled "CATEGORIZATION OF INFORMATION USING NATURAL LANGUAGE PROCESSING AND PREDEFINED TEMPLATES," filed on Sep. 23, 2004, all of which are hereby incorporated by reference in their entirety.

BACKGROUND OF THE INVENTION

The present invention relates generally to a system and method for producing an optimal language model for performing speech recognition.

Today's speech recognition technology enables a computer to transcribe spoken words into computer recognized text equivalents. Speech recognition is the process of converting an acoustic signal, captured by a transducive element, such as a microphone or a telephone, to a set of text words in a document. These words can be used for numerous applications including data entry and word processing. The development of speech recognition technology is primarily focused on accurate speech recognition, which is a formidable task due to the wide variety of pronunciations, accents, and speech characteristics of native and non-native speakers of a particular language.

The key to speech recognition technology is the language model. A language model describes the type of text the dictator will speak about. For example, speech recognition technology designed for the medical profession will utilize different language models for different specialties in medicine. In this example, a language model is created by collecting text from doctors in each specialty area, such as radiology, oncology, etc. The type of text collected would include language and words associated with that practice, such as diagnoses and prescriptions. Most importantly, these language models may be developed for a regional or native language.

Today's state of the art speech recognition tools utilize a factory (or out-of-the-box) language model, which is often customized to produce a site-specific language model. A site-specific language model might include, for example, the names of doctors or hospital departments of a specific site using speech recognition technology. Unfortunately, it has been found that many factory language models and site-specific language models do not adequately address the problem of accented speech by a group. An example of such a group would include United Kingdom physicians dictating in United States hospitals using speech recognition technology.

Accented speech presents especially challenging conditions for speech recognition technology as the accented speech pronunciation of a language can result in misidentification and failed recognition of words. For example, a United Kingdom accented speaker or an Indian accented speaker in the United States will pronounce an English word, even after living in the United States for an extended period of time, dramatically different than an United States speaker. So much so, that a speech recognition engine using an United States language model, will misidentify or fail to recognize the English word.

Previous efforts to solve this problem included acoustic adaptation during individual speaker enrollment and factory language models that created with alternate pronunciations for some commonly used words for a particular application. These techniques are used to handle the pronunciation differences among varieties of speakers within the same region, such as southern accents and New York accents in the United States. Individual pronunciation idiosyncrasies that are subphonemic are typically addressed through speaker enrollment and adaptation of the acoustic model before the speaker starts using the speech recognition product. Some pervasive regional differences that are phonemic in nature are represented in the language model with alternative pronunciations for the same word. This situation applies to the classical differences such as "You say 'tuh-may-toh' and I say 'tuh-mah-toh'".

Unfortunately these techniques are only successful in providing recognition of a limited number of alternative phonemic pronunciations and require substantial time to personalize the acoustic model to an individual. Using these techniques to control for the ubiquitous pronunciation differences between accented speech and native speech would become costly and time consuming.

Another approach includes replacing the native acoustic models with distinct acoustic models for a class of speakers who share pronunciation features, and replacing native language models with dialect-specific language models. These distinct acoustic models and dialect-specific language models address the differences between the US English and United Kingdom English; they can be developed for any language or dialect. Not only are the distinct acoustic models and the dialect-specific language models large and cumbersome, but they also exhibit other undesirable results when used to accommodate accented speech. For example, United Kingdom English acoustic models and language models have different spellings such as 'colour', 'centre', and 'oesophagus'. Further, United Kingdom English employs different speech patterns and different vocabulary, such as different brand names for medical drugs.

Therefore, while speaker enrollment acoustic adaptation and alternate pronunciation factory language models can accommodate some level of accented speech, the expectation of speech recognition is significantly poorer than if distinct acoustic models and dialect-specific language models are used. Alternatively, speech recognition using distinct acoustic models and dialect-specific language models may transcribe accented speech more accurately but it also creates transcriptions which fail to conform to the native region's conventions of spelling, vocabulary and speech patterns. Furthermore, it is impractical and expensive to employ a completely different set of language models for a handful of individuals, such as a few United Kingdom physicians working in a US hospital.

Therefore, there exists a need for a speech recognition technology that automatically updates a factory or site-specific language model upon use by an accented speaker with words and pronunciations corresponding to the accented speech.

It may also be desirable to provide a speech recognition technology that allows language models for a particular language to be customized through the addition of alternate pronunciations that are specific to the accent of a dictator, for a subset of the words in the language model.

SUMMARY OF THE INVENTION

The present invention includes a system and method for modifying a language model such that a speech recognition engine can recognize accented pronunciation during automated speech recognition. The steps of the method may include accented speech identification, pronunciation differences identification, word instantiation of the pronunciation differences, accented speech file creation, and language model modification. The accented speech identification includes identifying accented speech pronunciations of words of a language. The pronunciation differences identification includes identifying pronunciation differences between customary speech pronunciations and the accented speech pronunciations. The word instantiation includes identifying, for each of the pronunciation differences, a first list of words in the language model that instantiate the pronunciation differences. The accented speech file creation includes selectively adding the first list of words and their accented speech pronunciations to an accented speech file. The language model modification includes modifying the language model according to the accent speech file.

Another aspect of the present invention may exclude subphonemic differences from the step of identifying pronunciation differences. The present invention may also selectively reduce the first list to words that are most frequently used in the language model, to words that intrude on other words if they are not given accented speech pronunciations, to short words, and to words with unrecognizable accented speech pronunciations. The modification of the language model may include supplementing the language model pronunciations with accented speech pronunciations and may also include replacing the language model pronunciations with accented speech pronunciations.

In another aspect of the present invention, the accented speech file may be used for cloning. The steps may include identifying clone pronunciations between customary speech and accented speech and selectively adding the clone pronunciations to the accented speech file.

The invention also includes a system and method for customizing a language model for accented speakers by identifying an accent and determining pronunciation differences between the identified accent and the language model. Other steps include selecting a first subset of the pronunciation differences based on a first set of pre-determined criteria, listing a first set of instantiations based on the first subset, and compiling an accent speech word list based on the first set of instantiations. The accent-specific pronunciations corresponding to words in the accent speech word list are determined and the accented speech word list and the accent-specific pronunciations are then applied to the language model.

In another aspect of the present invention, the method of determining the pronunciation differences includes considering systematic rule-governed differences, phonemic differences, and idiosyncratic criteria. The present invention also includes compiling the accent speech word list based on a second set of pre-determined criteria. The second set of pre-determined criteria may include at least one of word frequency, pronunciation intrusions, and word length. Identifying pronunciation intrusions may be based on a third set of pre-determined criteria.

The present invention also includes a system and method for modifying a language model by identifying accented speech pronunciations of words of a language and identifying pronunciation differences between customary speech pronunciations and the accented speech pronunciations. The method may also include identifying, for each pronunciation difference, a first list of words in the language model that instantiate the pronunciation differences. The method may selectively add the first list of words and their accented speech pronunciations to an accented speech file and selectively reduce the first list to a second list of words that are most frequently used in the language model. The method may then selectively add the second list of words and their accented speech pronunciations to the accented speech file and selectively reduce the second list to a third list of words, wherein the third list includes words that intrude on other words if they are not given accented speech pronunciations. The method may also then selectively add the third list of words and their accented speech pronunciations to the accented speech file and selectively reduce the third list to a fourth list of short words. The method may also then selectively add the fourth list of words and their accented speech pronunciations to the accented speech file and selectively reduce the fourth list to a fifth list of words with unrecognizable accented speech pronunciations. The method may then selectively add the fifth list of words and their accented speech pronunciations to the accented speech file. The language model may then be modified according to the accented speech file.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE PREFERRED EMBODIMENTS

The present disclosure will now be described more fully with reference to the Figures in which an embodiment of the present disclosure is shown. The subject matter of this disclosure may, however, be embodied in many different forms and should not be construed as being limited to the embodiments set forth herein.

Figure 1:
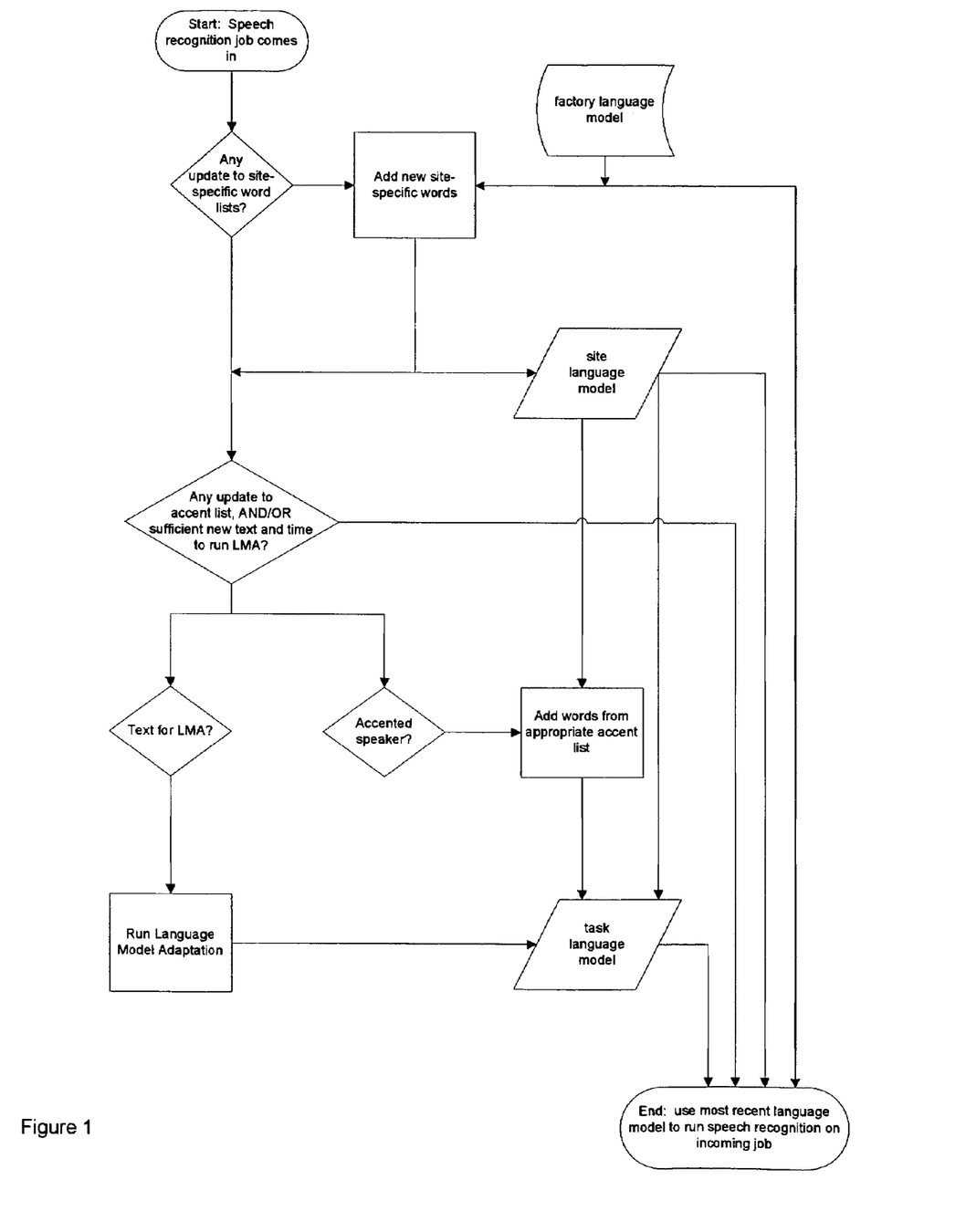
FIG. 1 shows an architecture view of the system and method for modifying a language model in accordance with certain teachings of the present disclosure.

Referring to FIG. 1, an architecture view shows the system and method for modifying a language model in accordance with certain teachings of the present disclosure. The architecture delivers a factory language model 25 to a final step 65. The architecture also provides for the creation of a site-specific language model 35 and/or a task language model 60 if sufficient data is available. If available, the site-specific language model and the task language model may be delivered to the final step 65. In the final step 65, the speech recognition engine selects the latest or most recently updated language model.

Multiple factory language models are available and each factory language model 25 focuses on a particular area or discipline. Within each factory language model 25, a particular group of words are included to assist in transcribing a dictation. In the preferred embodiment, the factory language model 25 is specific to one discipline of the medical community, such as radiology, pediatrics, oncology, cardiology, etc. Although the preferred embodiment includes a medical discipline as a factory language model 25, a factory language model on a legal discipline, academic discipline or other discipline may be employed without deviating from the scope of the invention.

The architecture begins with an initiating step 10 of recognizing a speech recognition job and providing the factory language model 25 to three locations in the architecture: the final step 65, the step 15, and the task language model 60. The step 15 determines if a site-specific word list exists for the creation of a site-specific language model 35. If a site-specific word list exists, then step 20 adds the site-specific words to the factory language model 25, thus creating a site-specific language model 35. The site-specific language model 35, if available, may then be provided to two locations in the architecture: the final step 65 and the task language model 60.

Site-specific word lists may be created by the user or the factory and include words unique to a particular site. For example, a radiology factory language model may be modified to a site-specific radiology language model by adding the department names of the site hospital and the names of physicians working at the site. If a site-specific language model 35 is created, then the model is site-specific, usable by any dictators at the site.

FIG. 1 also shows the step 30, which determines if there is an accented speech list to apply or if there is sufficient corrected text to create a task language model 60. In the preferred embodiment, the step 45 may determine whether the doctor or physician dictating is an accented speaker. Step 40 may determine if the doctor has enough corrected text reports 40 to create a task language model 60. If there is no accented speaker or new reports available for language model adaptation, then the factory language model 25 is provided to the final step 65 for possible use. While step 15 provides for site level modification, the step 30 provides for individual or specific user modification. If a task language model 60 is created, then the model is user specific, usable by the individual dictator.

In the case of language model adaptation only, step 55 will run the language model adaptation if sufficient corrected text reports exist to create a task language model 60. When no accented speaker or accented speech list is available, only the results of the language model adaptation are provided for creation of the task language model 60. The results of the language model adaptation are combined with the factory language model 25 or, if available, the site-specific language model 35 to create the task language model 60. The task language model 60 is then provided to the final step 65.

In the case of an accented speaker with an accented speech list, the accented speech list 50 may be used to create the task language model 60. When no language model adaptation is available, only the accented speech list 50 is combined with the factory language model 25 or, if available, the site-specific language model 35 to create the task language model 60. The task language model 60 is then provided to the final step 65.

In the case of both language model adaptation and an accented speaker being available, the accented speech list 50 and the results of the language model adaptation are combined with the factory language model 25 or, if available, the site-specific language model 35 to create the task language model 60, which is a unique and optimized task language model for the particular doctor or user. The task language model 60 is then provided to the final step 65.

Step 45 may also identify the specific accent of the speaker such that the appropriate accented speech list may be added in step 50. For example, if the accented speech is determined to be United Kingdom English, then a United Kingdom English accented speech list or file would be used in steps 50 and 60 to create a task language model 60.

In the final step 65 of the modification architecture, the most updated and specific language model possible is provided for the speech recognition job. Therefore, if the site-specific language model is more recent than a factory language model, then the site-specific language model will be used for the job. Likewise, if a task language model is the most recent language model available at the final step 65, then the task language model will be used for the job.

Figure 2:
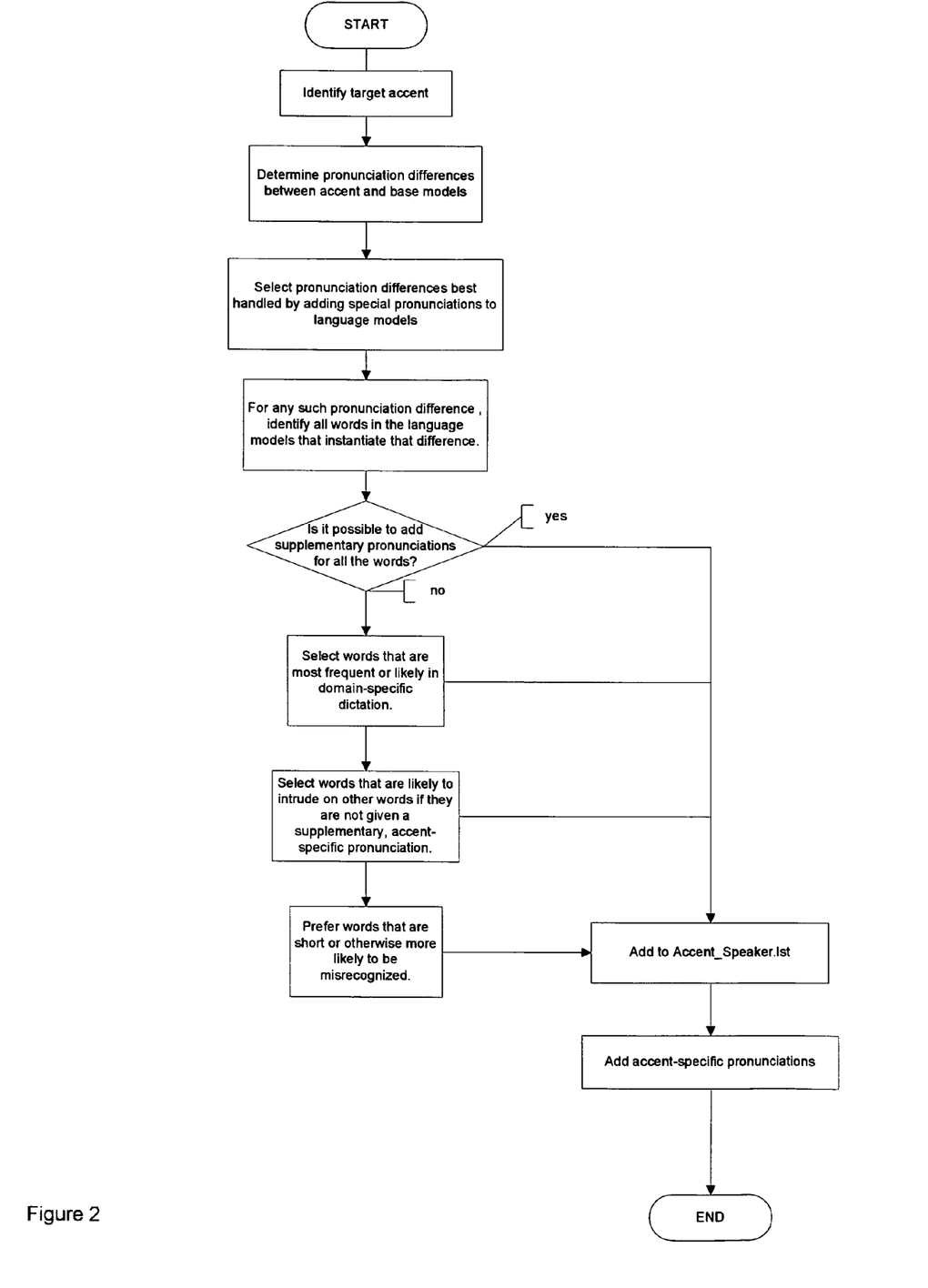
FIG. 2 shows an accented speaker list creation in accordance with certain teachings of the present disclosure.

Referring to FIG. 2, the creation of an accented speech list starts with 100 and creates the accented speech list 50 of FIG. 1. The step 110 may identify an accent and the pronunciation differences between the accented speech pronunciations and the pronunciations of the language of the language model.

Step 110 also includes selecting a group of pronunciation differences based on a set of pre-determined criteria. The criteria may be used to determine the pronunciation differences that are best handled by adding special pronunciations to the language model. These criteria may include phonemic and subphonemic differences as well as systematic and idiosyncratic criteria.

Systematic rule-governed differences are those which follow a pattern and apply to all items that match certain criteria for all speakers of a certain accent. They can be described by deterministic linguistic rules of the form X→Y/Z_ or X→Y/_Z (read: X becomes Y after or before Z). For example, for some Indian accented English accents all words beginning with the letter 'p' are pronounced in an unreleased fashion that sounds more similar to 'b' to United States English speakers. A second more familiar example is the pronunciation of the letter combination 'ar' within a syllable. In most United States English dialects, speakers pronounce the 'r' such that the words sound approximately like 'ahr' (although in Boston its more 'ae' and in the Bronx its more 'aw.'); in United Kingdom English pronunciation, the 'r' is not pronounced such that the pronunciation is approximately 'ah.' These systematic rule-governed differences may or may not need supplemental pronunciations in the language model to be captured by a speech recognition engine.

Not every pronunciation difference will require supplemental accented speech pronunciations because the language model pronunciations provided by the factory or by the site-specific language models will sufficiently recognize some words pronounced with an accent. In this case, the accented pronunciation differs subphonemically from the language model pronunciations and therefore the pronunciation differences do not need to be encoded as separate or supplemental pronunciations in the language model. This kind of accented speech pronunciation is probably best handled by speaker enrollment, possibly in conjunction with acoustic models specific to the speaker's accent.

However, some subphonemic differences may nonetheless result in phoneme merger. Sometimes two differences in pronunciation, which individually do not merge phonemic differences, collaborate to merge a phonemic difference when compared to the factory language models. Supplemental accented speech pronunciations in the language model may be necessary to handle these sorts of pronunciation differences. Using the Indian accented English as an example, syllable-initial p,t,k are aspirated across the board in United States English, but never in Indian accented English. Because the difference between aspirated and unaspirated stops is subphonemic in United States English, it might be assumed that that there is no need for supplemental accent-specific pronunciations in the language models. However, there are two possible problems: unaspirated /p/ sounds like /b/ to the untrained United States English speaker's ear, and for many speakers of Indian accented English, /f/ is pronounced as an aspirated /p/. Thus, although only allophone is involved here, the distinction between two distinct phonemes in United States English is merged. So for such Indian accented speakers, 'fit' is likely to be misidentified as 'pit'.

Although subphonemic differences may not generally require special accent-specific pronunciations, phonemic differences will require special accent-specific pronunciations in the language model. For example, one phonemic difference is in the placement of word stress. In English, the placement of word stress can vary greatly across dialects, and this has salient acoustic effects, in part because when a vowel goes from being accented to unaccented, its quality changes. For another example, if accented speakers pronounce /t/ where United States English speakers pronounce a 'th' sound, 'breath' and 'Brett' will sound alike. To improve the chances of 'breath' being properly recognized, the /bret/ accent-specific pronunciation should may be added to the language model for the word 'breath.'

Note that there are too many words in the United States English language models with the 'th' sound in them to provide supplementary pronunciations for all of them. However, a word like 'breath' is an excellent example of a word that is likely to be used in medical dictation. In the preferred embodiment, 'breath' might be a good candidate for inclusion in the accented-language list.

Morpheme-governed phonemic and stress differences also require special accent-specific pronunciations in the language model. Certain suffixes are pronounced differently and trigger different stress patterns in United States English as opposed to United Kingdom English. These differences are defined by whole classes of words whose accented pronunciations would best be handled by distinct pronunciations. For example, in Indian accented English and United Kingdom English, the suffix '-atory' has a long 'a' that has the primary word accent. This is quite different from the suffix '-atory' in United States English.

The above mentioned pronunciation differences are generally systematic rule-governed; that is differences that apply predictably across an entire set or a subset of words in a lexicon based on a rule or set of rules. However other differences such as unsystematic and idiosyncratic differences may also be corrected with supplemental pronunciations.

Unsystematic differences do not follow any specific pattern and unsystematic phonemic and stress differences can create pronunciation differences requiring special accent-specific pronunciations in the language model. An example is the word 'schedule,' pronounced with a 'sh' sound in United Kingdom and Indian English but pronounced with a 'sk' sound in United States English. This difference is unsystematic because it does not apply to all words beginning with 'sch' ('schema' is not pronounced with 'sh'). Furthermore, in Indian accented English, the word stress is on the first syllable of 'developed' but the stress is on the second syllable in United Kingdom English and United States English. The discovery of these unsystematic differences is more anecdotal than other phonemic differences that are rule-governed.

Idiosyncratic differences are those accent pronunciations specific to an individual. It may be possible that more than one speaker shares an idiosyncratic difference, but an entire group does not share an idiosyncratic difference. Idiosyncratic differences are generally not rule-governed.

In the preferred embodiment, the language model is in United States English and the accented speech is United States English spoken with the pronunciations of the user's accent. However, the native language model could be in any language and the accented speech could be the native language spoken with any accent common to a group of individuals.

For any given pronunciation difference in the selected group of step 110, step 120 may identify all words in the language models that instantiate the pronunciation difference. Step 120 may create a list of the identified instantiations.

Step 130 of FIG. 2 determines if it is possible to add the entire list of instantiations and accented speech pronunciations corresponding to the identified words in the list of instantiations. If so, the instantiations and corresponding accented speech pronunciations are added in step 170 to the accented speech file. However, if the list is too large, steps 140, 150, and 160 can be used to select a subset of the list of instantiations likely to make the most significant improvement in recognition of the accented speech.

In step 140, a subset of the list of instantiations may be selected by considering those words that are most frequently or likely dictated words in the list of instantiations. Using an Indian accent and a medical language model as an example, the accented speech would replace the United States English 'th' with 't' and a special pronunciation of 'thyroid' should be considered for selection in the subset. Likewise, 'theobalda' could conceivably come up in dictation but considering that it is not as likely as 'thyroid', it should be included only if there is enough space for both.

In step 150, a subset of the list of instantiations may be selected by considering those words that are likely to intrude on other words if they are not given a supplementary, accented speech pronunciation. Using the same Indian accent example, the pronunciation of 'thick', pronounced with the 't' sound rather than the 'th' sound, might well intrude on 'tick' or 'tic' unless 'thick' is given an alternate 't' pronunciation.

Pronunciation intrusions may be handled in different ways. One would be to provide new accented pronunciations in the language model for the intruding word and the intruded word. Another method, the method used in the preferred embodiment, may include the intruding word being given a supplemental pronunciation such that the intruding word and the intruded word share a pronunciation. For example, the word 'thick' and 'tic' would share the pronunciation 'tic.' Statistical methods in the language model could be used to determine which word was intended by an accented speaker when the speech recognition engine encounters the pronunciation 'tic.' Therefore, removing pronunciation intrusions may be accomplished by providing the intruding word with the shared pronunciation such that the intruding and intruded-upon words may be distinguished by means other than pronunciation (such as language model statistics).

In step 160, a subset of the list of instantiations may be selected by considering the length of the words, specifically words that are short or otherwise more likely to by misidentified. Again using the same Indian accent example, the word 'atherosclerosis' is more likely to be recognized without the benefit of a supplementary pronunciation than 'thick'.

Once a sufficiently sized list or subset of instantiations is found through steps 130, 140, 150, and 160, the words in the list or subset of instantiations along with the corresponding accented speech pronunciations are added to the accented speech file in step 170. Once the accented speech file is produced, the accented speech file creation is finished in step 180 and the accented speech file can be added to the site-specific language model in step 50 of FIG. 1.

The accented speech file can also be used to include clones for correcting accent-specific phrases or patterns. So, for instance, when dictating parentheses, some accented speakers might say, 'left paren', 'left parenthesis', 'begin parenthesis', or 'begin paren'. There are a variety of ways of dictating the beginning of a pair of parentheses. By including all the pronunciation clones for dictating parentheses, the clones all behave the same way even though they have different pronunciations. Although in general, the accented speech file is not intended for the purpose of adding language-specific or accent-specific vocabulary words to the United States English language model, there are some commonly used punctuation words that would provide benefit to an accented speaker if included in a task language model. For instance, most United Kingdom English and Indian accented English speakers say 'full stop' instead of 'period' at the end of a dictated sentence. Although 'full stop' is not in an United States English language model, a clone of 'period' could be added to the task language model by the accented speech file such that an accented speaker could use both 'period' and 'full stop' and still conform to United States English dictations norms.

It will be apparent to one of skill in the art that described herein is a novel system and method for modifying a language model. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

The invention claimed is:

1. A method for customizing a language model for accented speakers, the method comprising the steps of:
    identifying an accent;
    determining pronunciation differences between the identified accent and the language model;
    selecting a first subset of the pronunciation differences based on a first set of pre-determined criteria;
    listing a first set of instantiations based on said first subset and compiling an accent speech word list from the first set of instantiations based on a second set of pre-determined criteria;
    determining accent-specific pronunciations corresponding to words in the accent speech word list; and
    applying the accented speech word list and the accent-specific pronunciations to the language model.

2. The method of claim 1, wherein the second set of pre-determined criteria includes at least one of word frequency, pronunciation intrusions, and word length.

3. The method of claim 2, wherein pronunciation intrusions are based on a third set of pre-determined criteria.

4. The method of claim 1, wherein the second set of pre-determined criteria includes pronunciation intrusion wherein intruding and intruded-upon words may be distinguished by means other than pronunciation.

5. A method for modifying a language model, the method comprising the steps of:
    identifying accented speech pronunciations of words of a language;
    identifying pronunciation differences between customary speech pronunciations and the accented speech pronunciations;
    identifying, for each of said pronunciation differences, a first list of words in the language model that instantiate said pronunciation differences;
    selectively adding the first list of words and their accented speech pronunciations to an accented speech file;
    selectively reducing the first list to a second list of words that are most frequently used in the language model;
    selectively adding the second list of words and their accented speech pronunciations to the accented speech file;
    selectively reducing the second list to a third list of words, wherein said third list includes words that intrude on other words if they are not given accented speech pronunciations;
    selectively adding the third list of words and their accented speech pronunciations to the accented speech file;

selectively reducing the third list to a forth list of short words;
selectively adding the fourth list of words and their accented speech pronunciations to the accented speech file;
selectively reducing the fourth list to a fifth list of words with unrecognizable accented speech pronunciations;

selectively adding the fifth list of words and their accented speech pronunciations to the accented speech file; and
modifying the language model according to the accented speech file.

* * * * *